US008219633B2

(12) United States Patent
Fainberg et al.

(10) Patent No.: US 8,219,633 B2

(45) Date of Patent: *Jul. 10, 2012

(54) ACCELERATION OF WEB PAGES ACCESS USING NEXT PAGE OPTIMIZATION, CACHING AND PRE-FETCHING

(75) Inventors: Leonid Fainberg, Qiryat Gat (IL); Ofir Ehrlich, Tel Aviv (IL); Gil Shai, Givntaim (IL); Ofer Gadish, Raanana (IL); Amitay Dobo, Kibbutz Lahay (IL); Ori Berger, New York, NY (US)

(73) Assignee: Limelight Networks, Inc., Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/245,711

(22) Filed: Sep. 26, 2011

(65) Prior Publication Data

US 2012/0089695 A1 Apr. 12, 2012

Related U.S. Application Data

(63) Continuation of application No. 12/848,611, filed on Aug. 2, 2010.

(60) Provisional application No. 61/213,959, filed on Aug. 3, 2009, provisional application No. 61/308,951, filed on Feb. 28, 2010.

(51) Int. Cl.
*G06F 15/16* (2006.01)

(52) U.S. Cl. ......... 709/213; 709/200; 709/219; 715/827

(58) Field of Classification Search .................. 709/200, 709/203, 213, 219; 715/827
See application file for complete search history.

(56) References Cited

U.S. PATENT DOCUMENTS

| | | | |
|---|---|---|---|
| 5,802,292 | A | 9/1998 | Mogul |
| 6,023,726 | A | 2/2000 | Saksena |
| 6,055,572 | A | 4/2000 | Saksena |
| 6,067,565 | A | 5/2000 | Horvitz |
| 6,085,226 | A | 7/2000 | Horvitz |
| 6,098,064 | A | 8/2000 | Pirolli et al. |
| 6,272,534 | B1 | 8/2001 | Guha |
| 6,338,096 | B1 | 1/2002 | Ukelson |
| 6,385,641 | B1 | 5/2002 | Jiang et al. |

(Continued)

OTHER PUBLICATIONS

Wikipedia, “Web accelerator”, Retrieved on Mar. 14, 2012, from http://en.wikipedia.org/wiki/Web_accelerator, Jan. 11, 2012, p. 1-3.

(Continued)

*Primary Examiner* — Ario Etienne
*Assistant Examiner* — El Hadji Sall
(74) *Attorney, Agent, or Firm* — Kilpatrick Townsend & Stockton LLP

(57) ABSTRACT

A method and system for acceleration of access to a web page using next page optimization, caching and pre-fetching techniques. The method comprises receiving a web page responsive to a request by a user; analyzing the received web page for possible acceleration improvements of the web page access; generating a modified web page of the received web page using at least one of a plurality of pre-fetching techniques; providing the modified web page to the user, wherein the user experiences an accelerated access to the modified web page resulting from execution of the at least one of a plurality of pre-fetching techniques; and storing the modified web page for use responsive to future user requests.

24 Claims, 5 Drawing Sheets

U.S. PATENT DOCUMENTS

| | | | | |
|---|---|---|---|---|
| 6,578,073 | B1 | 6/2003 | Starnes et al. | |
| 6,834,297 | B1 * | 12/2004 | Peiffer et al. | 709/219 |
| 6,993,591 | B1 | 1/2006 | Klemm | |
| 7,007,237 | B1 | 2/2006 | Sharpe | |
| 7,084,877 | B1 | 8/2006 | Panusopone et al. | |
| 7,113,935 | B2 | 9/2006 | Saxena et al. | |
| 7,243,309 | B2 * | 7/2007 | Koay et al. | 715/827 |
| 7,249,196 | B1 | 7/2007 | Peiffer et al. | |
| 7,308,490 | B2 * | 12/2007 | Peiffer et al. | 709/219 |
| 7,483,941 | B2 | 1/2009 | Carlson et al. | |
| 7,594,003 | B2 * | 9/2009 | Davidson et al. | 709/219 |
| 7,594,013 | B2 | 9/2009 | Wang et al. | |
| 7,689,663 | B2 * | 3/2010 | Kinnan et al. | 709/217 |
| 7,818,686 | B2 * | 10/2010 | Cooke | 715/827 |
| 7,860,881 | B2 | 12/2010 | Haselden et al. | |
| 7,886,218 | B2 | 2/2011 | Watson | |
| 7,941,483 | B2 | 5/2011 | Narayanan et al. | |
| 7,958,232 | B1 | 6/2011 | Colton et al. | |
| 8,060,518 | B2 | 11/2011 | Timmons | |
| 2002/0078087 | A1 * | 6/2002 | Stone | 707/511 |
| 2002/0078165 | A1 | 6/2002 | Genty et al. | |
| 2004/0030717 | A1 | 2/2004 | Caplin | |
| 2004/0088375 | A1 | 5/2004 | Sethi et al. | |
| 2004/0215665 | A1 | 10/2004 | Edgar et al. | |
| 2005/0138143 | A1 | 6/2005 | Thompson | |
| 2005/0154781 | A1 | 7/2005 | Carlson et al. | |
| 2005/0198191 | A1 | 9/2005 | Carlson et al. | |
| 2006/0093030 | A1 | 5/2006 | Francois et al. | |
| 2007/0022102 | A1 | 1/2007 | Saxena | |
| 2007/0156845 | A1 | 7/2007 | Devanneaux et al. | |
| 2007/0256003 | A1 | 11/2007 | Wagoner et al. | |
| 2007/0260748 | A1 | 11/2007 | Talkington | |
| 2008/0139191 | A1 | 6/2008 | Melnyk et al. | |
| 2008/0228772 | A1 | 9/2008 | Plamondon | |
| 2008/0228911 | A1 | 9/2008 | Mackey | |
| 2009/0125481 | A1 | 5/2009 | Mendes da Costa et al. | |
| 2010/0149091 | A1 | 6/2010 | Kota et al. | |
| 2010/0169455 | A1 | 7/2010 | Gorham | |
| 2010/0269050 | A1 | 10/2010 | Kirkby et al. | |
| 2010/0281357 | A1 | 11/2010 | Fu et al. | |
| 2010/0299589 | A1 | 11/2010 | Yamada | |
| 2010/0306643 | A1 | 12/2010 | Chabot et al. | |
| 2011/0066676 | A1 | 3/2011 | Kleyzit et al. | |
| 2011/0113000 | A1 | 5/2011 | Marlow | |
| 2011/0289486 | A1 | 11/2011 | Revinskaya et al. | |
| 2012/0030224 | A1 | 2/2012 | Cohen et al. | |

OTHER PUBLICATIONS

Bogdanov et al., "A prototype of online privacy-preserving questionnaire system," 2010, 6 pages.

Gardner et al., "DOM: Towards a Formal Specification," Plan-X '08, Jan. 9, 2008, San Francisco, 10 pages.

Seifert et al., "Identification of Malicious Web Pages with Static Heuristics," IEEE, 2008, pp. 91-96.

* cited by examiner

| Block Index | Block type | Block Content |
|---|---|---|
| 0 | New Data | yx |

FIG. 5A

| Block Index | Block type | Start Position | End Position |
|---|---|---|---|
| 1 | Old Data | 1 | 3 |

FIG. 5B

| Block Index | Block type | Start Position | End Position |
|---|---|---|---|
| 2 | Old Data | 5 | 7 |

FIG. 5C

ACCELERATION OF WEB PAGES ACCESS USING NEXT PAGE OPTIMIZATION, CACHING AND PRE-FETCHING

CROSS-REFERENCES TO RELATED APPLICATIONS

This patent application is a continuation of and claims priority to U.S. patent application Ser. No. 12/848,611, filed on Aug. 2, 2010, which claims priority both to U.S. provisional patent application 61/213,959 filed Aug. 3, 2009, and further to U.S. provisional patent application 61/308,951 filed Feb. 28, 2010. All three of these applications are incorporated by reference in their entirety.

FIELD OF THE INVENTION

The present invention relates generally to accesses to web pages, and more specifically to the acceleration of access to such web pages from the user's experience perspective.

BACKGROUND OF THE INVENTION

The traffic over the world-wide-web (WWW) using the Internet is growing rapidly as well as the complexity and size of the information moved from sources of information to users of such information. Bottlenecks in the movement of data from web servers of the content suppliers to the users, delays the passing of information and decreases the quality of the user's experience. Traffic is still expected to increase faster than the ability to resolve data transfers over the Internet.

Prior art suggests a variety of ways in an attempt to accelerate web page content delivery from a supplier of the content to the users. However, there are various deficiencies in the prior art still waiting to be overcome. It would be therefore advantageous to overcome these limitations, as it would result in a better user experience and reduction of traffic load throughout the WWW. It would be further advantageous that such solutions be applicable with at least all popular web browsers and/or require neither a plug-in nor a specific browser configuration.

BRIEF SUMMARY OF THE INVENTION

Certain embodiments of the invention include a system for acceleration of access to web pages. The system comprises a network interface enabling communication of one or more user nodes with one or more web servers over a network for accessing web pages stored in the one or more web servers; an acceleration server coupled to the network interface for accelerating access to the web pages to the one or more user nodes using at least one pre-fetching technique; a first cache connected to the acceleration server and the one or more user nodes and operative to cache information associated with requests directed from the one or more the user nodes to the acceleration server; a second cache connected to the acceleration server and the one or more web servers and operative to cache information associated with requests directed from the one or more web servers to the acceleration server; and a memory coupled to the acceleration server and containing a plurality of instructions respective of the at least one pre-fetching technique.

Certain embodiments of the invention further include a method for acceleration of access to a web page. The method comprises receiving a web page responsive to a request by a user; analyzing the received web page for possible acceleration improvements of the web page access; generating a modified web page of the received web page using at least one of a plurality of pre-fetching techniques; providing the modified web page to the user, wherein the user experiences an accelerated access to the modified web page resulting from execution of the at least one of a plurality of pre-fetching techniques; and storing the modified web page for use responsive to future user requests.

Certain embodiments of the invention also include a method for acceleration of access to a web page. The method comprises receiving a request to access a web page; generating a query that includes at least a URL of the requested web site and one more URLs of web pages similar to the requested web page; generating a list of non-matching data blocks between the requested web page and at least one of the similar web pages; and generating a web page respective of the requested web page by combining common data blocks with non-matching data blocks, wherein the common blocks are retrieved from the at least one similar web page and the non-matching blocks are retrieved from the requested web page.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

FIGS. 5A, 5B, and 5C illustrate an exemplary data structure created by the technique shown in FIGS. 4A and 4B.

DETAILED DESCRIPTION OF THE INVENTION

Figure 1:
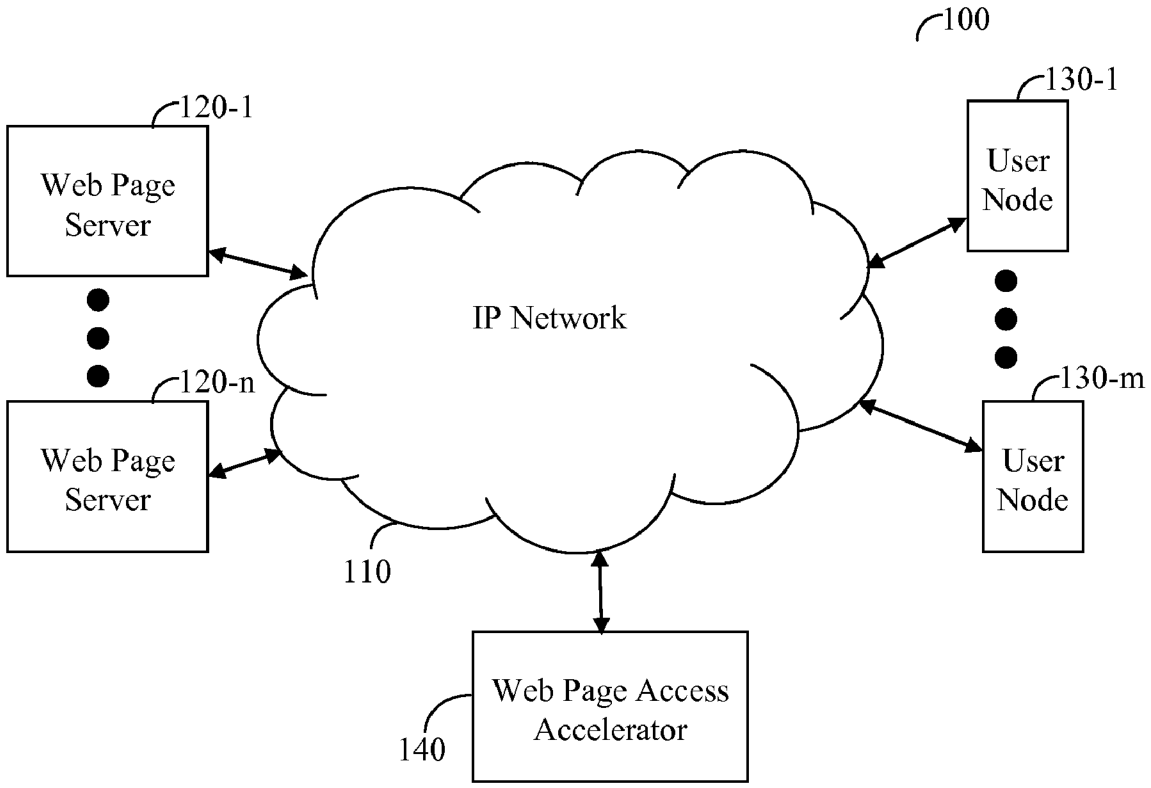
FIG. 1 is a schematic block diagram of a system for acceleration of web pages access.

The embodiments disclosed by the invention are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

In an exemplary but non-limiting embodiment of the invention, a web access acceleration system is placed in the path between the user nodes and the web servers and is responsible for integrating the acceleration mechanisms to the web pages selected for acceleration.

FIG. 1 depicts an exemplary and non-limiting schematic block diagram of a system 100 for acceleration of web pages access in accordance with an embodiment of the invention. A network 110 is connected to one or more web page servers 120, each providing content typically using formatted documents using, for example, the hypertext markup language (HTML). The network may be a local area network (LAN), a wide area network (WAN), a metro area network (MAN), the Internet, the world-wide-web (WWW), the like, and any combination thereof. One or more user nodes 130 that are viewers of such web pages content are also connected to the network 110. A user of a user node 130 typically browses the content using a web browser that is enabled to display the web pages. By using, for example but not by way of limitation, a uniform resource locator (URL) the browser is capable of accessing a desired web page.

The network 110 is also connected a web page access accelerator (WPAA) 140. In accordance with the invention instead of providing web page content directly from a web page server, for example, a web page server 120-1, to a user node, for example, a user node 130-1, traffic is directed through the WPAA 140, when applicable, i.e., when configured for accelerated access. Accordingly, a request for web page content is directed through WPAA 140 that is equipped with various acceleration mechanisms as further detailed herein below. In one embodiment of the disclosed invention, the web servers 120 are part of a server farm (not shown). In a further embodiment thereof, the WPAA 140 is provided as part of the server farm. In yet another embodiment of the invention, the WPAA 140 is integrated as an integral part of a web page server 120.

Figure 2:
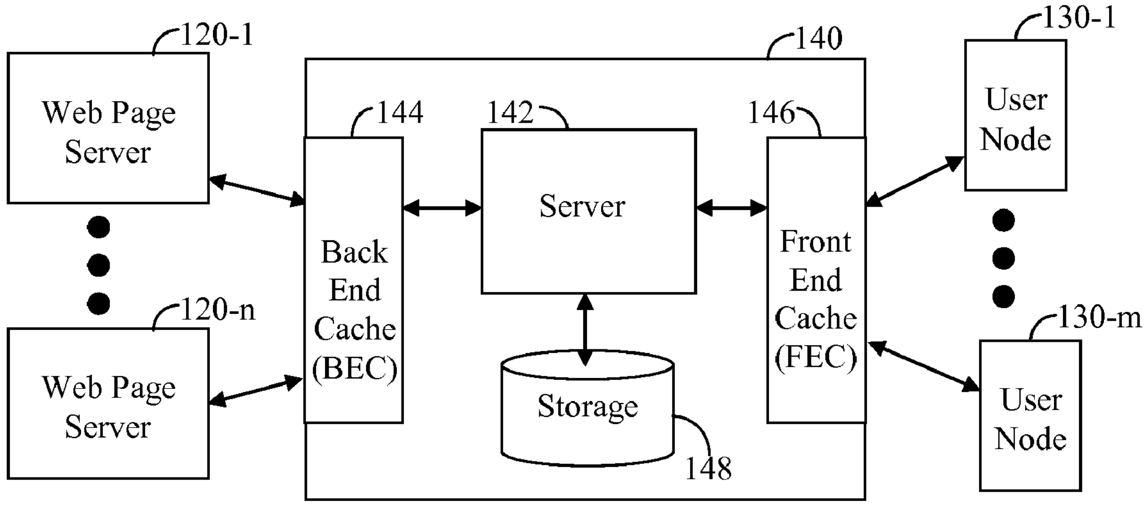
FIG. 2 is a schematic diagram of the data flow in a system for acceleration of web pages access.

FIG. 2 shows an exemplary and non-limiting schematic diagram of the data flow in a system for acceleration of web pages access in accordance with an embodiment of the invention is shown. In addition, the details of the structure of the WPAA 140 are also shown. For simplicity reasons the network interface is removed, however, a network type interface is the typical way for such components to communicate with each other. The WPAA 140 comprises of an acceleration server 142 that is coupled to storage 148. The storage 148 typically holds instructions for the execution of one or more acceleration techniques, described herein below in more detail, that result in accelerating the transfer of web pages content to a user wishing to access such content. Under the control of the acceleration server 142, there is a back-end cache (BEC) 144, connected to the acceleration server 142 and to the one or more web page servers 120-1 through 120-*n*. The BEC 144 handles requests directed from the acceleration server 142 to the one or more web page servers 120. By caching information in BEC 144, overall access to web page content is accelerated. Under the control of acceleration server 142 there is a front-end cache (FEC) 146, connected to the acceleration server 142 and to the one or more user nodes 130-1 through 130-*m*. The FEC 146 handles requests directed from the one or more user nodes 130 to the acceleration server 142. By caching information in FEC 146, the overall access to web page content is further accelerated.

Figure 3:
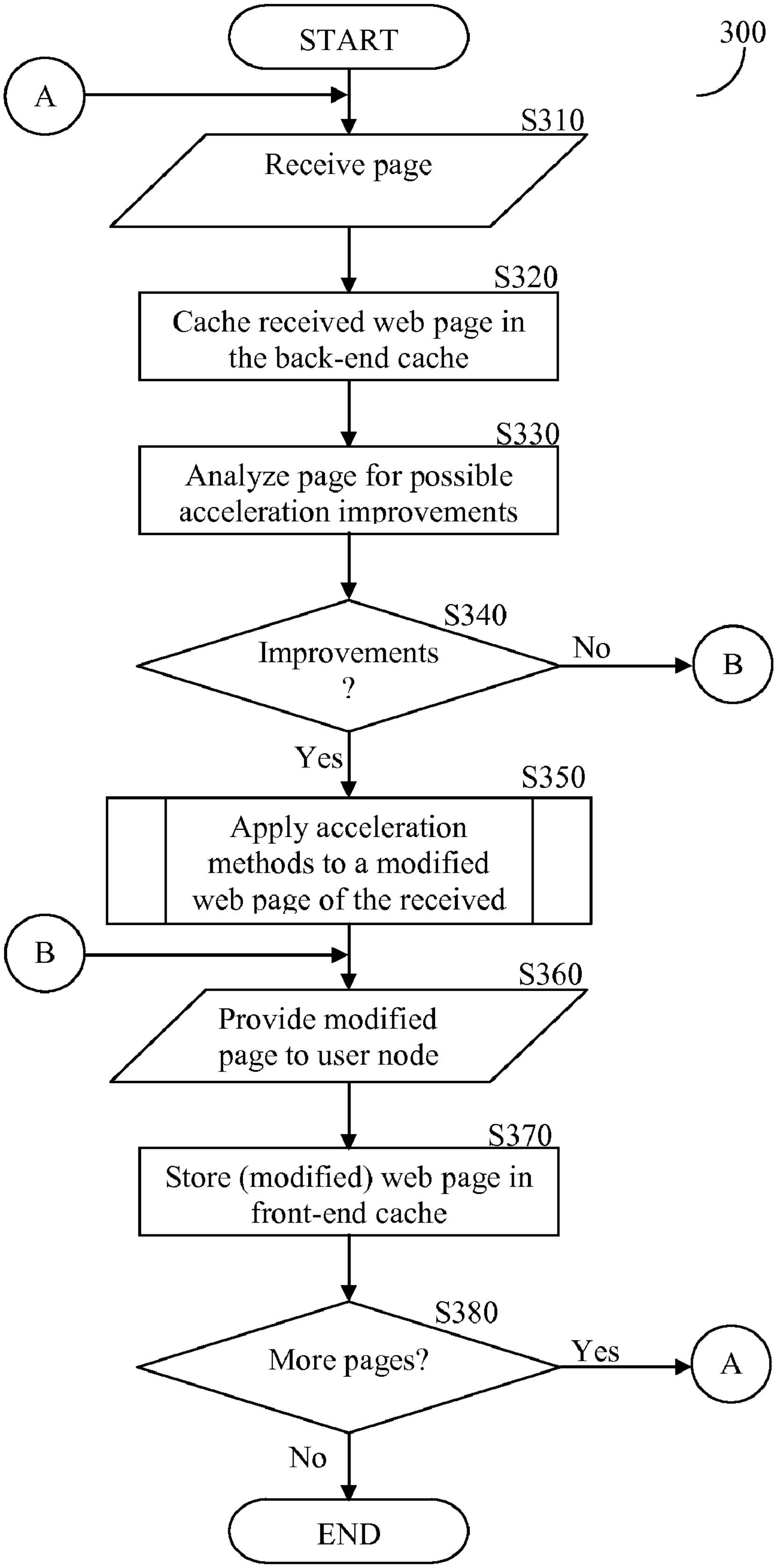
FIG. 3 is a flowchart of the processing performed for the purpose of generating web pages that accelerate access.

FIG. 3 shows an exemplary and non-limiting flowchart 300 of the processing performed for the purpose of generating web pages that accelerate access in accordance with an embodiment of the invention. In S310, a page is received, for example by the WPAA 140, in response to a request to receive a web page from, for example, web page server 120. Optionally in S320, the received web page is stored in a cache, for example, the BEC 144. In S330, the received web page is analyzed by acceleration server 142 using one or more acceleration and perfecting techniques (methods), to determine whether acceleration improvements may be achieved. In S340, it is checked whether improvements were determined to be achievable, and if so execution continues with S350; otherwise, execution continues with S360. In S350, the received web page is modified into a modified web page that contains one or more acceleration techniques discussed herein below in more detail. In S360, the modified or the received web page is provided to the user node 130 that requested the web page. Optionally in S370, the modified web page or the received web page, as may be appropriate, is stored in a cache, for example FEC 146. In S380, it is checked whether additional pages are to be handled and if so execution continues with S310; otherwise, execution terminates.

While reference is made hereinabove to web pages, it can equally refer to portions of web pages, resources of a web page, and the like, without departing from the scope of the invention. Resources of a HTML web page include, but are not limited to, stylesheet files, Javascript and other script files, images, video and any other parts of the pages which are not embedded in the HTML.

The method disclosed above may be performed by the WPAA 140, but without limitations. May be used in other web acceleration embodiments of the invention, including, integration in a web page server such as a web page server 120.

While the description hereinabove was made with respect to one particular system, other systems may be deployed to benefit from the teachings hereinabove and herein below. In one exemplary and non-limiting embodiment of the invention, a system that works as a plug-in/filter/extension to one or more web servers is used. The flow of data through the system is the same as described with respect of the system in FIG. 1, however, it may also utilize knowledge about the data stored on the web site, such as but not limited to, page template and images. In yet another exemplary and non-limiting embodiment, the disclosed pre-fetching acceleration techniques may be implemented in whole or in part as one or more plugins of a web site integrated development environment (IDE). Using a plugin, the inventions herein are integrated into the web site during its development. The plugin therefore enables at "compilation" or "build" process of the IDE, changes to the web site coding made by the user of the web site developer according to the inventions. This may take place during development or automatically implemented during development. In yet another exemplary and non-limiting embodiment of the invention, a utility containing, for example and without limitation, a command line component, a user interface (U1) component or any other interface, is run on the designed web site code after it is ready, and/or in one or more points-in-time during the development thereof, to transform the web site code by employing the inventions herein.

Following are descriptions of acceleration techniques used with respect to, for example, S350, discussed above. However, the use of such techniques may be a part of other embodiments which are specifically included herein.

I. Web-site and Browser Transparent Pre-Fetching

Conventional pre-fetching of resources in web pages may be implemented in one of the following ways: a) installing a browser plug-in or any other desktop software which fetches resources and pages in the background using its own algorithms; b) introducing new tags and syntax into the HTML, HTTP and Javascript to provide "hints" to the browser regarding a potential pre-fetch, however, modern popular browsers do not provide any kind of support to such "hint language"; and c) designing, as a part of the website, a mechanism which pre-fetches resources with a mechanism that the browsers support, however, this puts a burden on the designer of the website to write and maintain this pre-fetch code.

In accordance with an embodiment of the invention, the pre-fetching is performed by deploying the WPAA 140 in the communication path between the web page server 120 and the client or user node 130. In other embodiments of the invention, pre-fetching of web-pages' resources can be done using a proxy, which is a component running on the same machine as the web server 120 or any other appropriate solutions capable of achieving the teachings below. Neither the web page server 120 nor the browser on the user node 130 is ware that this component exists, i.e., the WPAA 140 is transparent to the operation of web page servers 120 and user nodes 130. The WPAA 140 analyzes the pages going through it and changes the web page to contain the pre-fetch code that may be created using methods and mechanisms described herein. The definition of which resources to pre-fetch and where on the page to locate the code may be defined in configuration, reached by static analysis of pages or dynamic analysis of pages and traffic, determined using changing statistics, or other applicable techniques as well as any combination of thereof. The code generated instead of the original code of the web page is designed to be understood and processed by modern browsers and does not require any additions to it.

One advantage over prior art, is that even if the web site has not changed, the same page can contain code to pre-fetch different resources every time. This may be advantageous, for example, if or when the usage pattern of a web page changes. Moreover, the fact that neither the user 120 nor the web page server 130 needs to be aware of the existence of the WPAA 140 between them.

In one embodiment, the WPAA 140 intercepts the web page and parses it prior to sending it out to a user node 130. The original web page may reside in the BEC 144. The acceleration server 142 based on instructions contained in storage 148 parses the web page in accordance with the invention described above and provides a modified web page, which may also be stored in the FEC 146 for future use by other user nodes 130.

II. Pre-fetching Resources of Subsequent or Other Pages

Today's pre-fetch techniques, pre-fetch either whole pages or the HTML part of the web page. This is problematic if when the exact next pages are not necessarily known. For example, if the web page has a dynamic component it may change between accesses to the web page.

According to the principles of the invention there is performed pre-fetching of the resources of other or subsequent pages, with or without the HTML page itself. As many of the resources are common to several or all the pages that may be fetched and therefore pre-fetching such resources is likely to save fetching them for other pages.

In one embodiment, the WPAA 140 intercepts the web page and parses it prior to sending it out to the user. The original web page may reside in the BEC 144. The acceleration server 142 based on instructions contained in the storage 148 parses the web page in accordance with the invention described above and provides a modified web page, which may also be stored in the FEC 146 for future use by other user nodes 130.

III. Fetching Linked Pages on Demand Prior to Link Access

In some cases, after browsing a site for a while, some of the new pages load very quickly. Most of their resources are already in the browser's cache, so the only non-cached items are the HTML itself and a few resources which have not been seen on previous pages yet. In such cases, loading the HTML from the network is a big percentage of loading the entire web page, even when the HTML is loaded very quickly.

According to the principles of the invention there is added a script, for example, Javascript, which detects the mouse presence over a link, a button, or any other means pointing by means of a URL, or other applicable means, to another page. This script may be further enabled to detect whether the focus is on the link, the button, or otherwise point of entry to another URL, which is particularly relevant to cases when the navigation is done using the keyboard and not the mouse. After the detection, the script, might or might not wait a while to reduce the number of false positives, before it pre-fetches the relevant page. If, during this time, the mouse moved from location of a URL, or has otherwise lost its focus of the web page, the pre-fetch is canceled. If the page pointed to by the link is small and the server is fast, many times it is possible to bring the page to the browsers cache before the link is actually clicked, thus substantially reducing the load time of that page as it appears to the user.

In one embodiment of the invention, a post-processing tool parses a web page prepared by a developer for adding a detection script implementing the principle described above. In another embodiment, the WPAA 140 intercepts the web page and parses it prior to sending it out to the user. The original web page may reside in the BEC 144. The acceleration server 142 based on instructions contained in storage 148 parses the web page in accordance with the invention described above and provides the web page with the detection script implementation. The modified web page may also be stored in the FEC 146 for future use by other user nodes 130.

IV. A Path Dependent Web Page Delivery to a User

On the same web site, many pages have common resources. Thus, it is important to know on a page whether the resources are already in the browser's cache or not. For example, different optimizations should be applied on the page to load it faster.

As for most web sites the resources in the cache typically expire within several hours, it is usually correct to assume that if the page was reached from a different page in the same web site, the common resources will be in the browser's cache and if not, most of them will not. Thus, according to an embodiment of the invention, a web page is processed differently for a case where it was reached from within the web site and for the case it was reached from without the web site. The conclusion about where the page was reached is determined according, for example but without limitation, the HTTP headers of the web page, a special cookie, the existence of a "referrer" header, a configuration or any other technique.

In one embodiment, the WPAA 140 intercepts the web page and sends the user a different version thereof. The original web page may reside in the BEC 144. The acceleration server 142 based on instructions contained in storage 148 parses the web page in accordance with the invention described above and provides the web page with the detection script implementation. The modified web page may also be stored in the FEC 146 for future use by other user nodes 130. Other implementations may include, without limitations, having a component as part of the web page server 120 enabled to perform this acceleration technique, or installing a software utility on the user node 130, enabled to transform the web page differently according to its origin.

V. Caching of Dynamic Data

There are several levels of server-side caching that a web server (e.g., a server 120) can use to increase its performance. If the web page is generated every time it is requested, one of this cache levels can be, and many times is, to keep a generated version of the page and serve it every time, re-creating it only when the content of the page is changed. If the HTML content of the page contains a part which differs between several instances of the page, and the number of such different instances is great, it is impossible to keep a cache of the described type as on the HTML level, every different bit means a different page. Some web sites solve it by putting all the dynamic data, which changes between the instances, into a separate HTML page and load it as a "subpage". However, many sites have this type of data embedded into their HTML document, thus cannot maintain a cache of the described type.

According to an embodiment of the invention, caching of dynamic data includes separating the static parts of the HTML page from the dynamic parts. This can be performed by configurations, for example, "marking" parts of the HTML as static or dynamic, or automatically, by studying instances of the same page and deducing which parts are common. Once the static and dynamic parts of the page have been marked, this information can be used in two ways: a) the static part can be processed, for example, to achieve optimizations using, for example, techniques discussed in this document or otherwise, and the processed data kept in cache. Once a request for the page is accepted, the original page is requested and then the dynamic parts of it are "applied" on the processed static parts. The resulting page is then sent to a user node 130; and b) the static part, processed or not, is sent to a user node 130 from the cache, without a request to the web server to obtain the original page. However, a code is injected into the page which directs the browser, without any need of additional support, to asynchronously send additional one or more requests to retrieve the dynamic data (see, for example, techniques to read resources into the cache). When the addition data is retrieved, it is injected into the DOM to the relevant places. In a preferred embodiment, this technique can be utilized web pages in which the dynamic part is relatively small, for example, the dynamic part includes fields where the username of a user is entered. In such web page, the entire page is first read from the server-side cache (e.g., BEC 144) and only the username's value is read from the web server (e.g., one of web servers 120) and is displayed later in the page. As the dynamic data is brought in an asynchronous way, this technique does not delay the loading of the common data.

In one embodiment of the invention, a post-processing tool parses a web page prepared by a developer for separating static and dynamic parts of the HTML page in accordance with the principle described above. In another embodiment, the WPAA 140 intercepts the web page and parses it prior to sending the page out to a user node 130. The original web page may reside in the BEC 144. The acceleration server 142 based on instructions contained in storage 148 parses the web page in accordance with the invention described above and separating static and dynamic parts of the HTML page for the modified web page. The modified web page may also be stored in the FEC 146 for future use by other user nodes 130.

VI. Intelligent Caching of Resources

The cache in browsers operates in two ways. In a first aspect of operation, once a resource is loaded to the browser, the resource may include a header which instructs the browser how long it should be in its cache (either a period of time of the time of the expiry of the cache). While this resource is in the browser's cache, every time the browser needs it, the browser reads the resource from the cache and does not send a request for this resource. One the cache expires, the resource is deleted from the cache and the next time the browser needs the resource, the browser sends a request to get the resource. Any file type, such as but not limited to, HTML, Javascript, images, and CSS, may be affected therefrom. In a second aspect of operation, once a resource's time in the browser's cache is expired, and the browser needs the resource, the browser sends a request to the web server along with some information about the resource that it has in its cache, for example, its last modification time. Then the server may return, instead of the content of the request a message confirming that the existing resource that is up to date and may be used.

A severe limitation is that once a resource is in a browser's cache, it cannot be invalidated, except for explicitly doing so by the user by clicking "clear cache" in the browser. As for this resource, requests to the web server (e.g., one of web servers 120) are not sent, and furthermore, the server cannot even send a message indicating that the resource is not up to date. Thus, a web server cannot set too long of an expiration time as the resource may change and the browser will not be cognizant of it. On the other hand, any request, even when resulting with the server sending a message indicating that the resource is up to date, is time consuming and often delays the loading time of the web page, thus setting too short an expiration period hurts performance.

In accordance with the invention, every resource is equipped with a version indication and this version is increased every time when the resource is changed. Every whole web page, i.e., a web page along with all its resources, also has a version. This version is a tuple, or otherwise a combination of the versions of all its resources, including the HTML page itself. In one example, a hash function may be used to change the resource's version every time any resource is changed. The version of the page, or an identifier that stands for this version, is sent to the user along with the web page every time it is requested. If the user has already accessed that page once or more, the version of the page the user has, or an identifier which stand for this version, is sent with the request. In one embodiment, this is achieved by means of cookies. All the resources are sent with a very long expiration time. Thus, when the browser encounters these resources it will take them from the browser cache.

Once the web server (e.g., one of web servers 120) receives a request for web page, the WPAA 140 intercepts the request and checks the difference between the user's version and the current version of a resource in the requested web page. All the resources that have not changed are referenced "as is" and the references to resources which have changed are rewritten to point to the new references. This is done by changing the filename of the pointed resource or its query string. For example, but not by way of limitation, changing the reference of "image.1.jpg" to point to "image.2.jpg" which is the newer version or changing the reference of "image.jpg?ver=1" to point to "image.jpg?ver=2". This way requests are made to the new versions of the changed resources.

The disclosed technique can also be applied to parts of resources. For example, if the difference between the new version of the HTML and the version the user has is only one line and the HTML is big, the browser can request only this one line and run a client-side code which applies this line into the cached data. In order to use this technique on HTML pages, a stub can be used in the following sequence: a) the browser requests a file. This file is very small and the web server directs the browser never to cache it. Along with the request the version of the web page is sent; and, b) the server then directs the browser (can be used in a number of ways: a response "redirect" header or a code embedded in the response which forces the browser to request a new page or to bring the difference and apply it). The redirected page depends on the version and may be cached.

VII. Processing Links in the Background

When prior to serving a page a web server (e.g., one of web servers 120), or a proxy, has to do some processing, for example, generate or optimize the page. Such processing delays the loading of the page. In some cases, processing of a page can be performed in the background, but there are web sites with a huge amount of pages, for example, results of different queries, and they cannot be all processed in the background in a reasonable time.

When a page is served by a web server or proxy, the pages which are candidates for being the next pages to be server for the same user nodes are also processed. The candidate web pages can be deduced either statically from analyzing the current page, for example, by looking at all the links, or by collecting statistics and choosing accordingly, by a configuration or a combination, for example, checking if there are many links and the order of their processing is defined by the statistics. This can be done recursively to any depth and repeating the process on all the chosen pages.

VIII. Sending the Common Part of a Plurality of Web Pages Once

Typically, pages of a particular web site contain common data. This is done mostly to keep a consistent look and feel to the web site. This is notable for pages derived from the same template, but also in the case of pages from different templates. Every time a browser requests a page, the response contains the entire page, including the common parts. This is repeated over and over again and of course burdens the bandwidth requirements and slows it unnecessarily as no new data is in fact transferred to the viewer. According to an embodiment of the invention, the common data between pages is sent only once.

Therefore, in accordance with the principles of the invention only the non-common data of a page is sent to the user every time that the user requests the page, while the common data is sent only once. This requires a server side component, or a proxy in the pathway between the user node (e.g., a user node 130) and a web server (e.g., one of the web servers 120). In an embodiment of the invention, this acceleration technique is performed by the WAPP [sic] 140.

Specifically, the WPAA 140 computes the differences (also referred to herein as "diff") between the requested pages and sends only such differences to a browser of a user 130. In addition, only for the first time that the page was requested the common portions are sent as well. A client side component (e.g., a user node 13) receives the common parts once, and then creates the entire data item using the common parts and differences for a specific page. It should be noted that either item itself or its representation, for example, in DOM format, may be sent.

The diff can be created in various levels and using a variety of algorithms. The diff can be created from the text of the web pages, or from any logical representations thereof, for example and without limitation, the DOM of the page can be used to create a diff, when the pages are compared on the DOM elements level. One example of creating a diff is using a "rsync"-like algorithm. The diff of a page the user navigates to, or for that matter any other page, can be calculated using the current page the user is at or any other pages the algorithm recognizes or can assume that the user has. This way a page for which the diff is the smallest can be chosen. The diff can be applied by loading the non-common part using a synchronous connection and then applying the diff, or using asynchronous communication such as AJAX and then when the diff is ready, adding the diff to the web page.

Figure 4A:
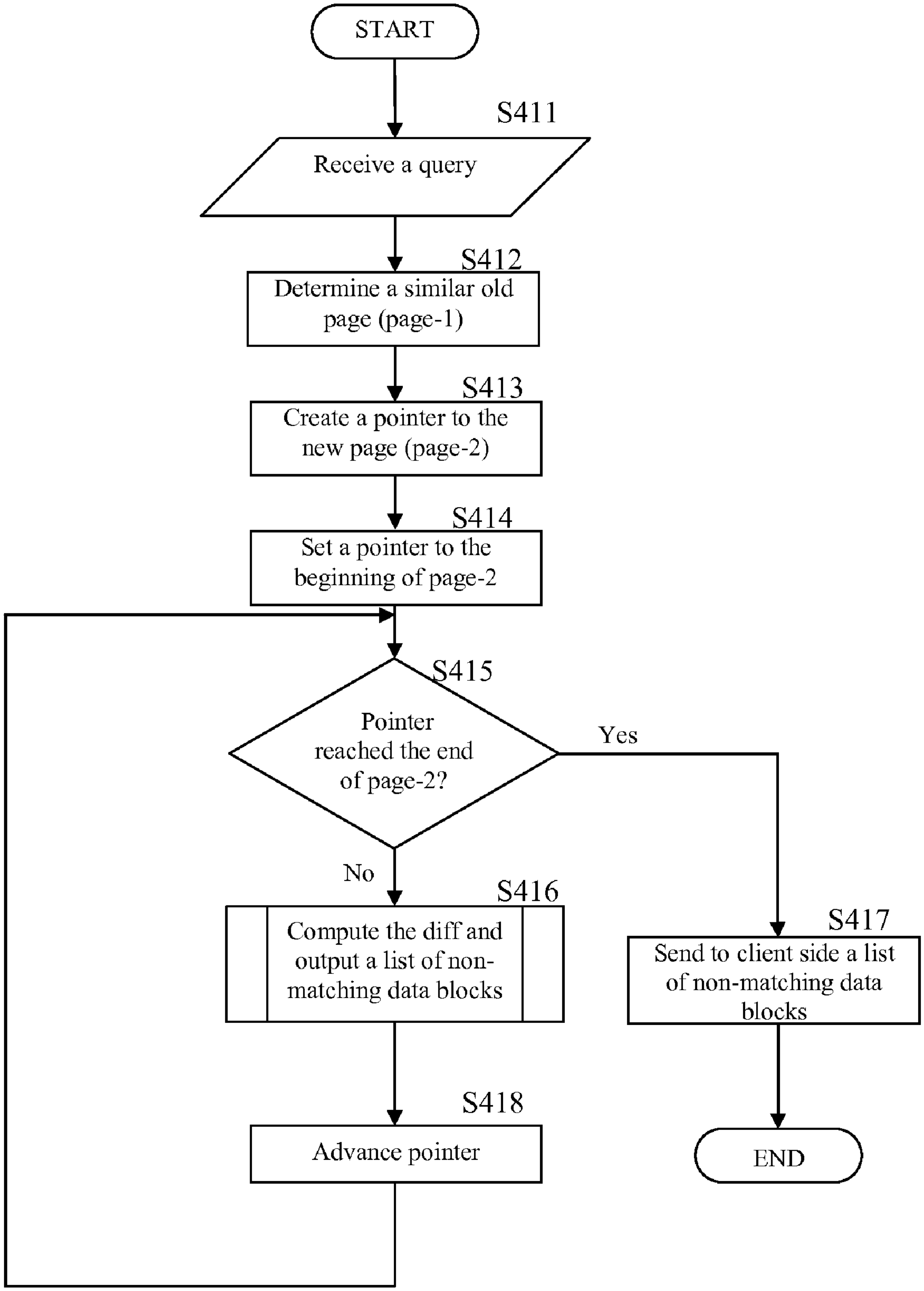
FIGS. 4A and 4B are flowcharts illustrating the operation one of the perfecting acceleration technique in accordance with an embodiment of the invention.
Figure 4B:
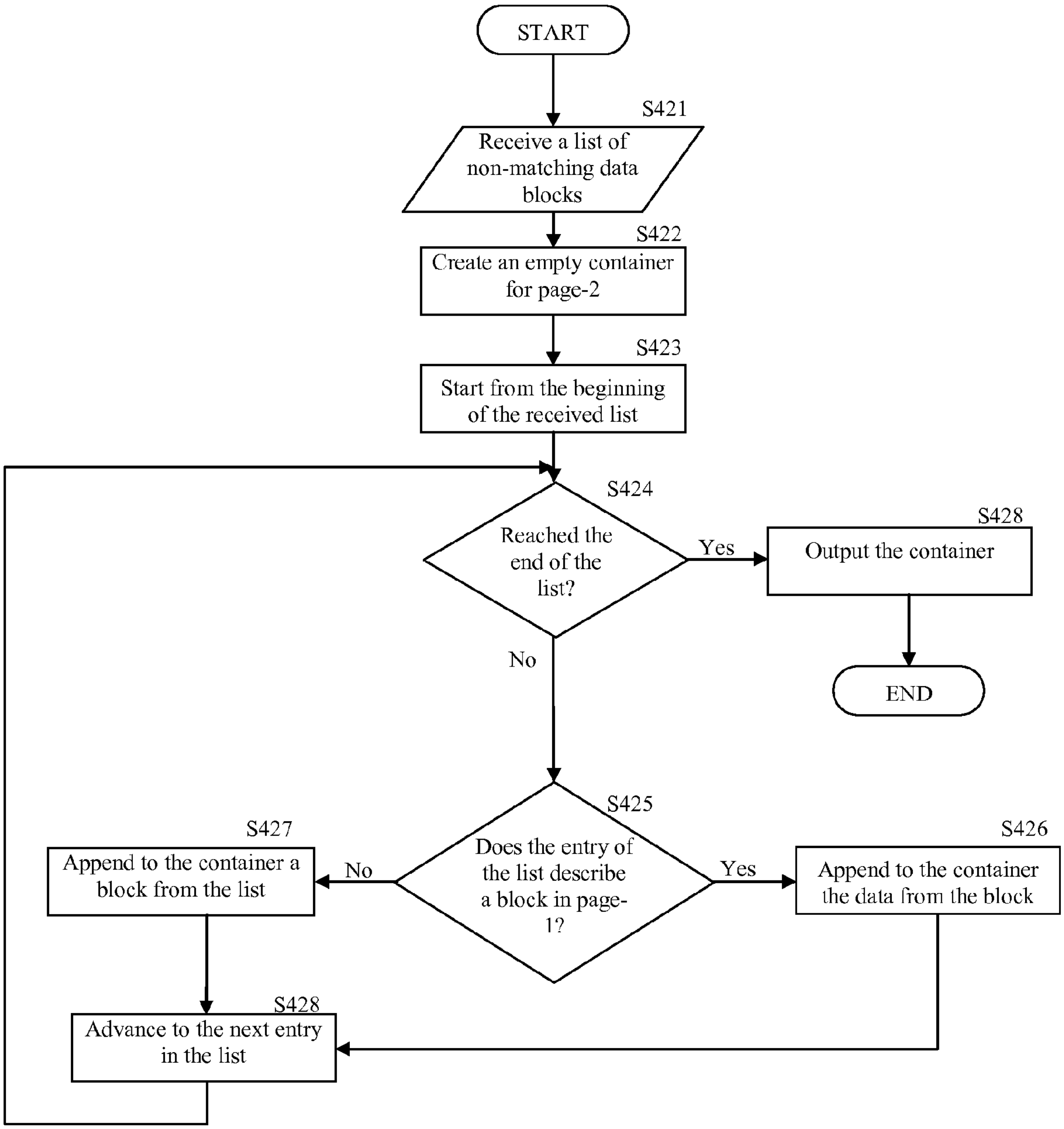

FIGS. 4A and 4B are non-limiting and exemplary flowcharts illustrating the operation of the "sending the common part of a plurality of web pages once" acceleration technique in accordance with an embodiment of the invention. This technique is performed by a client side which may be one of the use nodes 130 and a server side which may be the WPAA 140.

The processing of a web page according to this technique is initiated once a user clicks on a link. The link may be in a form of a URL directing to another page. According to this embodiment, the user action (i.e., clicking on the linking) invokes an AJAX query to the server side. The query contains the current URL, the URL that the user wants to navigate to, and information about which additional URLs from the same website the user's browser cache contains.

The AJAX query initiates the process performed by the server side and further depicted in FIG. 4A. In S411, the server side receives the AJAX query. At S412, it is determined which of the URLs that the user already accessed, has the smallest diff from the requested URL. The (old) page that corresponds to the URL is marked as "page-1" and the page that corresponds to the URL that the user navigates to is marked as "page-2". Thereafter, a pointer is created and further pointed to the beginning of page-2 (S413 and S414). The pointer is used for sequentially scanning of page-2 when the diff is computed. Once the pointer reaches the end of page-2, the process terminates (S415 and S418).

At S416, the diff between page-1 and page-2 is computed to create a list of non-matching data blocks and their positions in-page 1. In exemplary embodiment of the invention, S416 can be performed using any rsync-like algorithms. One with ordinary skill in the art would be familiar with the operation of such algorithms. At S417, the server side sends to the client side the created list and the URL of page-1.

The client side, upon receiving the list of non-matching data blocks, applies the diff to page-1 to create the modified page which should is identical to page-2. That is, the nee page to be viewed is a combination of the content of page-1 and the diff as contained in the received list. The client side can use a rsync mechanism to combine the received diff and page-1. It should be noted that page-1 is stored in the client side's cache.

FIG. 4B shows a non-limiting and exemplary flowchart illustrating the process performed by the client side (e.g., a user node 130) in accordance with an embodiment of the invention. The process creates a modified page-2 that contains the content of page-1 and non-matching blocks. In S421, a list of non-matching block as computed by the server side (e.g., WPAA 140) is received. In S422, an empty container for the modified page-2 is created. The process scans the received list from its beginning unit its end when filling the container (S423, S424 and S428). In S425 it is checked if a current selected entry is the received list describes a data block in page-1, if so, in S426, the respective data block from page-1 is append to the container; otherwise, in S427, the respective data block from the received list is appended to the container. At S429, once all entries in the created list have been checked, the container including the contents of the modified page-2 is output.

This acceleration technique can be used in combination with the use of the browser's cache, with resource combining, or in-lining. When resources are being in-lined inside an HTML page, or for that matter any other container, the cache of the browser is less efficient than when the resources are taken from external files. However, using the described technique, when the same resource is in-lined in two or more different pages, it is not loaded from the server twice, as the "rsync" algorithm, or another appropriate algorithm, compresses it to several bytes only.

Following is a non-limiting example describing this acceleration technique as applied on resources contained in a web page. In this example, an old resource (resource-1) contains the data "zabcd1234" and a new resource contains (resource-2) the data "yxabc34". The process for creating a list of non-matching data blocks (e.g., as shown in FIG. 4A) outputs the list in a form of a data structure illustrated in FIGS. 5A through FIG. 5C.

The process, as described with reference to FIG. 4B, uses that created list and resource-1 (containing "zabcd1234") to generate a modified resource-2 as follows: after processing block 0, the modified resource-2 container contains "yx", after processing block 1, the modified resource-2 container includes “yxabc”, where the new data added being “abc” as it is the data which is located between positions 1 and 3 of resource-1. Then, upon processing of block 2, the modified resource-2 container includes “yxabc123”, where the new data being added is “123” located between positions 5 and 7 of the resource-1. As can be noticed the container include the content of the resource-2.

It should be noted that this process accelerates the access to the new page/resource (page-2/resource-2) as instead of loading the new page only differences should be retrieved from the server-side as the content of the old page/resource (page-1/resource-1) is cached at the client side.

IX. A Technique for Measuring the Load Time of a Web Page

The load sequence of a typical web page consists of many different resources. Some of the resources are visible while others are not. Some of the visible resources are part of the viewport and others are not. Additionally, the speed a web page loads, is that which is perceived by a user once the viewport is complete. It is close to impossible to deduce when the page has finished loading from the user’s point of view based merely upon network analysis. Current measurement techniques either calculate such time once all the components of the page have finished loading, including those that are invisible, or check the “onload” event of the HTML document, which also has only a small correlation to the actual user perceived load time.

In most websites, the last item to be loaded in the viewport is a graphic item, such as an image of a Flash object. This happens because the size of graphic items is big and takes time to load. Furthermore, graphic items are often loaded later than the textual, i.e., HTML, JavaScript, CSS, etc., elements. Using this assumption, the following acceleration techniques measures the actual perceived load time of a web page:

- For every background image, the server creates invisible dummy images that are marked as loaded when the background image finishes loading.
- The time the page starts loading is saved in memory.
- Once every predefined time interval, that can be set to different values, depending on the desires granularity of the result, the following is performed:
  - All the graphical elements in the web page are checked, for example, by scouting the DOM of the web page, by lists exported by the browser, such as document images, or by any other means. The elements can be images, Flash objects, or any other type of element.
    - For every element found, its position is calculated, for example, by using all the elements starting from the desired elements and finishing at the root of the DOM tree, or by any other way.
    - If the element’s position is in the viewport, it is added to the known viewport element list.
  - Save to storage, persistent or not, a graphical snapshot of the screen that may contain only the browser, or any other part of the screen, along with the elapsed time passed since the start load time. These snapshots can be later analyzed to determine the exact time the viewport has finished rendering.
  - Repeat the process for all the known element lists previously created.
    - If any of the elements has not finished loading yet, which can be determined by a readyState property or any other way, then wait for the next iteration.
    - If all the elements are loaded, check if enough time has passed since the last element in the list was loaded and since the list was last changed. If enough time passed, where “enough time” can be defined to be any suitable value, the time the last resource in the list was loaded is marked as the time the page ended loading.
- Return, display, or otherwise store in memory the load time which is the end of loading time minus the start of loading time, in addition to marking the snapshot corresponding to the time the document perceived to be fully loaded.

X. Using Versioning to Cache Combined Files

One technique to reduce latency when reading multiple resources is to combine resources files, and thereby reducing the overall latency. When creating combined resource files, one loses the advantage of the browser cache. Thus, the same resource which is part of two or more files now combined will not be cached between these different files.

Every resource from a combined file is assigned a unique identifier which includes its version. This can be any unique number and it can be any hash function of the content or the name or URL of the file. For example, the popular hash function MD5 can be used to assign a unique identifier to a hash function. Either the use node 130 or the web server 120 holds in their internal storage the identifiers of the resources already read and have in the respective cache. In case of a user node 130, the identifiers may be stored in a browser cache, a Flash storage, a local storage, or any other storage type. In case the server holds this data, it holds it for every client, either in memory, or in storage such as a disk or any other location. In this case, every user is uniquely identified (for example using an identification cookie), thus this data can be saved for any user separately.

In the case where the user node 130 (or client) stores the resources data, the web server 120 adds a script at the beginning of every web page that performs the following actions:

- For every relevant resource on the page:
  - Check if this resource, including version, is present in the storage.
    - If it exists, replace the URL of the resource pointed to by the cached inline file, and as may be applicable to a position in it.
    - If it does not exist, add its path to the list of missing resources and replace the URL of the resource pointed to by a new combined file which contains all the missing resources, and as may be applicable to a position in it.
- Send the list of all the missing resources as part of a request to the server. This request asks for an inlined file with all the missing resources. The names or identifiers of the missing resources may be passed in the query string or in any other way.

This way all the resources which were already seen by the browser in previous combined files are taken from there and all the resources which were not previously seen by the browser will arrive in a new single combined file. Another way to implement this is to save all the information about every user in the sever side. This way the page which is served by the server already contains the correct URL’s (whether those which are already in the cache or new ones) and it needs not to be replaced by a client-side script.

In the case where the web server 120 stores the resources data, the server 120 performs the following action of the web page before sending it to the user:

- Identify the user (for example using a cookie).
- If the user was not found, assume that the user does not have any resource in the browser’s cache.
- If the user is identified, get from the storage (either memory, or disk or any other storage) the resources that the user has in the browser's cache and the names of the container that have these resources in them.

Create one or more empty containers, which will be used for the resources the user does not already have.

Scan the web page for resources and for each resource performs the following:

If the user already has it in the browser's cache, replace the reference to the resource by the reference of the resource in the container the user already has.

If the user does not have the resource in the browser's cache, add the resource to one of the prepared containers and change the reference to the resource to point to the resource in the container.

At the end of the process all the resources the user already has will be referenced to containers the user has in its cache and the new resources will be referenced to the resources in the new containers. Thus only the new resources will be downloaded by the client, combined in the prepared one or more containers.

In one embodiment of the invention, the tasks performed by the web server 120 when combining resources can be performed by the WPAA 140. According to this embodiment, the WPAA 140 intercepts the page before sending to the user node 130, determines where the resources data resides, and modifies the web page based on the location of the resources data.

The principles of the invention and embodiments thereto are implemented as hardware, firmware, software or any combination thereof. Moreover, the software is preferably implemented as an application program tangibly embodied in a program storage unit, a non-transitory computer readable medium or a non-transitory machine-readable storage medium that can be in a form of a digital circuit, an analogy circuit, a magnetic medium, or combination thereof. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

What is claimed is:

1. A system for acceleration of access to web pages, wherein the system comprises:

a network interface enabling communication of one or more user nodes with one or more web servers over a network for accessing web pages stored in the one or more web servers;

an acceleration server coupled to the network interface for accelerating access to the web pages to the one or more user nodes using at least one pre-fetching technique;

a first cache connected to the acceleration server and the one or more user nodes and operative to cache information associated with requests directed from the one or more the user nodes to the acceleration server;

a second cache connected to the acceleration server and the one or more web servers and operative to cache information associated with requests directed from the one or more web servers to the acceleration server; and a memory coupled to the acceleration server and containing a plurality of instructions respective of the at least one pre-fetching technique, wherein the at least one pre-fetching technique comprises:

adding a version indicator to a current version of a web page, said version indicator of the current version of the web page comprising a plurality of sub-indicators;

receiving a request for the web page from one of the user nodes, the request comprising a version indicator of a cached version of the web page, the cached version of the web page being stored in the first cache;

comparing the version indicator of the cached version of the web page to the version indicator of the added version indicator of the current version of the web page, the comparing the version indicator of the cached version of the web page to the added version indicator of the current version of the web page comprising comparing one or more sub-indicators of the cached version of the web page to one or more corresponding sub-indicators of the current version of the web page;

determining whether the cached version of the web page is up to date based on the comparison between the version indicator of the cached version of the web page to the added version indicator of the current version of the web page;

upon determining that the cached version of the web page is not up to date, sending a response to the one of the user nodes that directs the one of the user nodes to present at least part of the current version of the web page; and providing the current version of the web page to the one of the user nodes from a web server only if there is a difference between the added version indicator of the current version of the web page and the version indicator of the cached version of the web page.

2. The system for acceleration of access to web pages as recited in claim 1, wherein the plurality of sub-indicators comprises a sub-indicator for each of a plurality of resources of the web page.

3. The system for acceleration of access to web pages as recited in claim 1, wherein the added version indicator of the current version web page comprises an indicator of a version a stylesheet file, script file, image and/or video which are not embedded in hypertext markup language code of the web page.

4. The system for acceleration of access to web pages as recited in claim 1, wherein adding the version indicator to the current version of the web page comprises updating a version indicator associated with the web page.

5. The system for acceleration of access to web pages as recited in claim 1, w herein the request for the web page comprises a cookie, and the cookie comprises the version indicator of the cached version of the web page.

6. The system for acceleration of access to web pages as recited in claim 1, wherein the response directs the one of the user nodes to present the at least part of the current version of the web page by directing the one of the user nodes to update a pointer to point to a current version of a resource of the web page.

7. The system for acceleration of access to web pages as recited in claim 1, wherein the response directs the one of the user nodes to present the at least part of the current version of the web page by including a web-page redirect instruction in the response.

8. The system for acceleration of access to web pages as recited in claim 1, wherein the response directs the one of the user nodes to present the at least part of the current version of the web page by directing the one of the user nodes to request another web page.

9. The system for acceleration of access to web pages as recited in claim 1, wherein the response directs the one of the user nodes to present the at least part of the current version of the web page via code embedded in the response.

10. The system for acceleration of access to web pages as recited in claim 1, wherein the response directs the one of the user nodes to present the at least part of the current version of the web page by causing the one of the user nodes to modify the cached version of the web page being stored in the first cache.

11. The system for acceleration of access to web pages as recited in claim 1, wherein the response directs the one of the user nodes to present the at least part of the current version of the web page by providing a web-page redirect instruction to the one of the user nodes.

12. A method for acceleration of access to web pages, comprising:

receiving a request from a user via a browser, the request requesting a web page, the request comprising a version indicator identifying a version associated with the web page that has been previously cached by the browser, said version indicator identifying the version associated with the webpage that has been previously cached by the browser comprising a plurality of sub-indicators;

comparing the version indicator that identifies the version associated with the web page that has been previously cached by the browser to a version indicator identifying a current version associated with the web page, wherein the comparing the version indicator that identifies the version associated with the web page that has been previously cached by the browser to the version indicator identifying the current version associated with the web page comprises comparing one or more sub-indicators of the version indicator that identifies the version associated with the web page to one or more corresponding sub-indicators of the version indicator identifying the current version;

determining whether the web page that has been previously cached by the browser is up to date based on the comparison between the version indicator identifying the version associated with web page that has been previously cached by the browser and the version indicator identifying the current version associated with the web page; and upon determining that the web page that has been previously cached by the browser is not up to date, sending a response to the browser, wherein the response directs the browser to present at least part of the current version associated with the web page to the user.

13. The method for acceleration of access to web pages as recited in claim 12, wherein the response directs the browser to present the at least part of the current version associated with the web page by providing the current version associated with the web page, and wherein the current version associated with the web page comprises a current version of the web page.

14. The method for acceleration of access to web pages as recited in claim 12, wherein a sub-indicator is provided for each of a plurality of resources of the current version of the web page.

15. The method for acceleration of access to web pages as recited in claim 12, wherein the version indicator that identifies the current version associated with the web page identifies a version of a resource of the current version of the web page.

16. The method for acceleration of access to web pages as recited in claim 12, wherein the version indicator that identifies the version associated with the web page that has been previously cached by the browser identifies a version of a resource of the version of the web page that has been previously cached by the browser.

17. The method for acceleration of access to web pages as recited in claim 12, wherein the version indicator of the version associated with the web page that has been previously cached by the browser and the version indicator of the current version associated with the web page each comprise: an indicator of a version of a stylesheet file, script file, image and/or video which are not embedded in hypertext markup language code of the web page that has been previously cached by the browser.

18. The method for acceleration of access to web pages as recited in claim 12, wherein the response directs the browser to present the at least part of the current version of the web page by directing the browser to update a pointer to point to a different version of a resource of the requested page.

19. The method for acceleration of access to web pages as recited in claim 12, wherein the response directs the browser to present the at least part of the current version of the web page by including a web-page redirect instruction.

20. The method for acceleration of access to web pages as recited in claim 12, wherein the response directs the browser to present the at least part of the current version of the web page via code embedded in the response.

21. The method for acceleration of access to web pages as recited in claim 12, wherein the response directs the browser to present the at least part of the current version of the web page by directing the browser to request another web page.

22. The method for acceleration of access to web pages as recited in claim 12, wherein the response directs the browser to present the at least part of the current version of the web page by causing the browser to modify the web page that has been previously cached by the browser.

23. The method for acceleration of access to web pages as recited in claim 12, wherein the response directs the browser to present the at least part of the current version of the web page by providing a web-page redirect instruction to the browser.

24. A non-transitory computer readable medium having stored thereon instructions for causing one or more processing units to execute the method for acceleration of access to web pages as recited in claim 12.

* * * * *

UNITED STATES PATENT AND TRADEMARK OFFICE

CERTIFICATE OF CORRECTION

PATENT NO. : 8,219,633 B2
APPLICATION NO. : 13/245711
DATED : July 10, 2012
INVENTOR(S) : Leonid Fainberg et al.

It is certified that error appears in the above-identified patent and that said Letters Patent is hereby corrected as shown below:

On Title Page, below Abstract, “24 Claims, 5 Drawing sheets” should be corrected to read --25 Claims, 5 Drawing Sheets--.

<u>In the what is claimed</u>

Please add claim 19

19. The method for acceleration of access to web pages as recited in claim 12, wherein the request comprises a cookie, and the cookie comprises the version indicator of the version associated with the web page that has been previously cached by the browser.

Please renumber the following claims:

Column 16, Line 35, please delete “19.” and insert --20.--.

Column 16, Line 39, please delete “20.” and insert --21.--.

Column 16, Line 43, please delete “21.” and insert --22.--.

Column 16, Line 47, please delete “22.” and insert --23.--.

Column 16, Line 52, please delete “23.” and insert --24.--.

Column 16, Line 57, please delete “24.” and insert --25.--.

Signed and Sealed this
Fifth Day of February, 2013

Teresa Stanek Rea
*Acting Director of the United States Patent and Trademark Office*